United States Patent
French et al.

(10) Patent No.: US 6,263,074 B1
(45) Date of Patent: Jul. 17, 2001

(54) USER PROGRAMMABLE STATION SET BASS AND TREBLE CONTROL

(75) Inventors: Harry Tapley French, New York City, NY (US); Christine Mary Gerveshi, Scotch Plains; G. N. Srinivasa Prasanna, Clinton, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/100,067

(22) Filed: Jun. 19, 1998

(51) Int. Cl.[7] .................................................. H04M 9/00
(52) U.S. Cl. ............................... 379/389; 379/347
(58) Field of Search .................... 379/387, 347, 379/389, 391, 395

(56) References Cited

U.S. PATENT DOCUMENTS 5,471,527 * 11/1995 Ho et al. .............................. 379/347
5,852,610 * 12/1998 Olaniyan .............................. 370/486
5,896,449 * 4/1999 Oshidari et al. ..................... 379/347

* cited by examiner

*Primary Examiner*—Richemond Dorvil
(74) *Attorney, Agent, or Firm*—Wendy W. Koba

(57) ABSTRACT

A user-programmable bass/treble control circuit is embedded within a conventional remotely located codec. A subscriber station set is capable of transmitting out-of-voiceband "control" tones to increase/decrease bass and treble. A tone detector within the codec recognizes and removes these control tones, forwarding them to a programmable equalization filter inserted in the transmit signal path in the codec. The equalization filter will adjust the bass and treble of the to-be-transmitted signal in accordance with these received control tones. Advantageously, the "listener" at the other end will not hear the tones if the tone detector is inserted before the receiver. The user may adjust the tones during the entire conversation and the filter may be "reset" at call completion.

11 Claims, 1 Drawing Sheet

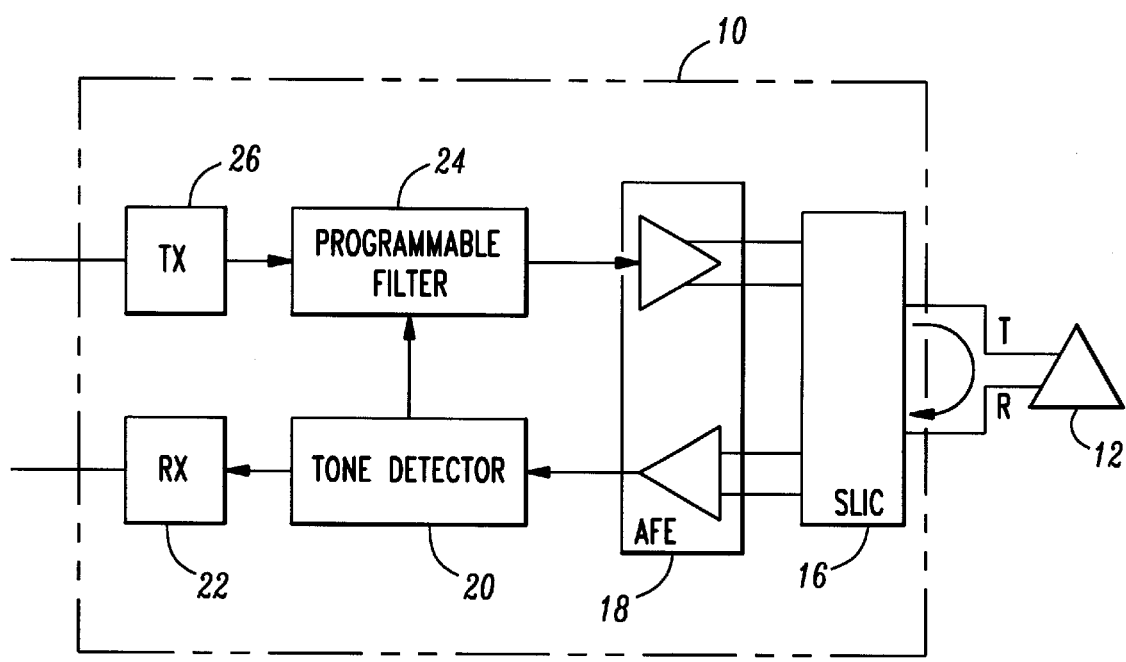
FIGURE

USER PROGRAMMABLE STATION SET BASS AND TREBLE CONTROL

BACKGROUND OF THE INVENTION

The present invention relates to a user-programmable bass and treble control on a telephone station set and, more particularly, to the use of tones outside the voice band to control (increase/decrease) the bass and treble levels.

DESCRIPTION OF THE PRIOR ART

In a typical digital loop carrier transmission system, such as Subscriber Loop Carrier (SLC®) systems, digital transmission takes place between a local digital switch and a remote terminal. The customer lines, or loops, couple customer premise equipment (such as a station set) to the remote terminal through channel units located at the remote terminal.

Due to variations in the lengths of the loops, it has been recognized that it is often necessary to add a certain amount of loss to the signals between the remote terminal and the station set in both the "off-hook" and "on-hook" states in order to protect against too loud of a signal for the shorter loops. In the case of the on-hook state, the standard approach has been to add a constant amount of loss to all customers coupled to the remote terminal. This has been effective in the past since there was a minimal amount of reflection back to the remote terminal.

To achieve better performance, it has been recognized that it would be advantageous to measure the actual impedance of the line and then set the receive and transmit equalizers (as well as other parameters) to match this measured value. Our co-pending application entitled "Line-Compensating Codec", Ser. No. 08/915,978, filed Oct. 22, 1997, discloses the utilization of a DSP in the remote terminal codec which ascertains the actual impedance presented by the line to which a station set is connected when the line is on-hook and also, without interfering with call processing, when the line is off-hook, by making the measurements before the return of dial tone and/or during interdigital interval of subscriber call signaling.

Although this capability to provide "real time" impedance adjustment is a significant improvement, each subscriber has individual preferences regarding sound quality. That is, some individuals prefer a "strong" bass and "weak" treble, some vice-versa, and still others may prefer "balanced" bass and treble in sound quality

SUMMARY OF THE INVENTION

The need remaining in the prior art is addressed by the present invention, which relates to a user-programmable bass and treble control on a telephone station set and, more particularly, to the use of out-of-band tones to control (increase/decrease) the bass and treble levels.

In particular, an exemplary station set is configured so as to be able to produce specific out-of-band tones, each tone representing an aspect of "bass" or "treble". For example, a tone of 3.4 kHz may be associated with "decrease" bass, a tone of 3.6 kHz may be associated with "increase" bass, 3.8 kHz with "decrease" treble and 4.0 kHz with "increase" treble. It is to be understood that any desired frequencies outside of the nominal voice band (i.e., 0–3 kHz) may be used and the set defined above is considered exemplary only. A central office line card (also defined as a "remote terminal") is configured to include a tone detector in the receive signal path. Upon reception of any these pre-defined tones, the tone detector transmits a control signal to a programmable equalization filter disposed in the transmit signal path within the line card. Any wellknown programmable equalization filter may be used and is capable of increasing/decreasing bass and treble in response to the tone detector control signal.

Advantageously, the far-end of the telephone conversation is oblivious to any bass/treble adjustments being performed by the near-end subscriber. In one embodiment of the present invention, the programmable equalization filter may be configured to detect an "on-hook" signal so as to reset the filter to a predetermined bass/treble condition at call completion. Otherwise, the subsequently-received telephone call will utilize the final value of the programmable filter set during the previous call.

Other and further advantages and features of the present invention will become apparent during the course of the following discussion and by reference to the accompanying drawing.

BRIEF DESCRIPTION OF THE DRAWING

Referring now to the drawing, the sole FIGURE illustrates an exemplary line circuit including bass/treble control means of the present invention.

DETAILED DESCRIPTION

The FIGURE illustrates both the transmit path (Tx) and receive path (Rx) of an exemplary 16-channel codec 10, such as the T7531/36 described in our co-pending application, modified as hereinafter described, in accordance with the present invention. Also illustrated in the FIG. 1 is an exemplary station set 12 that is connected by tip (T) and ring (R) lines to a subscriber line interface circuit (SLIC) 16 within codec 10. Indeed, it is the impedance within the "loop" formed by the tip and ring conductors with SLIC 16 that is adjusted to provide the desired "bass" and "treble" sound quality in accordance with the present invention. An analog/digital front end (AFE) 18 is coupled to the "line" side of SLIC 16, and (although not illustrated in the FIGURE) is also coupled to fifteen other SLICs within code 10 (for an exemplary 16-channel codec). Along the Tx path, AFE 18 functions to convert the received analog signal into a digital signal. Conversely, along the Rx path, AFE 18 functions to convert the to-be-transmitted digital signal into an analog representation.

In accordance with the present invention, a tone detector 20 is disposed in the receive signal path beyond AFE 18. Tone detector 20, which may comprise any arrangement well-known in the art for recognizing predetermined signals (a notch filter, for example). More particularly, tone detector 20 functions to both recognize and remove certain pre-defined frequencies from the signal received from station set 12. Once any treble/bass control tones are removed, the received voice signal is processed by conventional receiver apparatus within codec 12, represented by receiver 22 in the FIGURE. Any out-of-voiceband tones detected by tone detector 20 are subsequently directed as filter control signals to a programmable line equalizing filter 24. As shown in the FIGURE, programmable line equalizing filter 24 is disposed between conventional transmitting apparatus, represented by transmitter 26 in the FIGURE, and the transmit path input to AFE 18.

In operation, an exemplary station set 12 could be modified to include an extra set of keys for generating the set of four tones associated with "treble increase" (TI), "treble decrease" (TD), "bass increase" (BI) and "bass decrease"

(BD). For discussion purposes only, we will define these tones as follows:

TI=4.0 kHz
TD=3.8 kHz
BI=3.6 kHz; and
BD=3.4 kHz.

During a phone conversation, the individual using station set 12 can therefore increase the treble portion of the received signal by depressing the TI key on set 12. A 4.0 kHz tone will thereafter propagate along the ring lead and enter SLIC 16 at codec 10. The TI tone will pass unimpeded through SLIC 16 and AFE 18 (since tone TI is single frequency). Tone detector 20, which may include a notch filter centered at 4.0 kHz, will remove the TI tone from the remainder of the received signal. The TI tone will thereafter be applied as an input to programmable line equalization filter 24. Filter 24 is programmed to respond to the reception of a 4.0 kHz tone in a manner such that the filter taps are manipulated to increase the treble portion of the signal being transmitted. The actual design of such a filter is well-known in the art and is not considered germane to the discussion of the present invention. Advantageously, since tone TI is removed by tone detector 20, the other person involved in the telephone conversation is oblivious to any treble/bass adjustments performed by the person using station set 12.

Similarly, the bass portion of a received signal may be decreased by the user depressing the "BD" key on station set 12, causing a 3.4 kHz tone to be propagated along the Rx path through codec 10. As with the TI tone discussed above, tone detector 20 may be configured to include a notch filter centered at 3.4 kHz to "detect" and filter out a transmitted BD tone. The BD tone is thereafter applied as an input to programmable filter 24, which uses the BD tone to adjust the filter taps in a manner that decreases the bass portion of the signal to be transmitted. Obviously, the transmission of the TD and BI tones is performed in a similar manner, and tone detector 20 may be configured to also include notch filters centered at these control frequencies.

In general, the degree of bass/treble adjustment will be a function of the duration of the control signal. That is, as long as the tone is present, the sound will continue to be adjusted. It is an important advantage of the present invention that the inclusion of the bass/treble adjustment at codec 10—instead of merely including treble/bass control within the station set itself—removes the unwanted manipulation of the noise signal That is, if the treble/bass adjustment is performed at the station set, any noise signal introduced along the transmit path would also be subjected to the treble/bass adjustments. The utilization of the treble/bass adjustments at codec 10 avoids these noise signal problems.

In one embodiment, the arrangement of the present invention may include the use of a "reset" tone (5 kHz, for example), that is automatically transmitted from station set 12 to codec 10 when the station set returns to "on-hook". Alternatively, station set 12 may simply include a "reset" key that may be depressed. The purpose of the reset function is to return the parameters of programmable filter 24 to their initial conditions at the end of a phone call. This is an important feature when more than person may use the same station set, or when the physical conditions present on the loop are subject to change. In an alternative embodiment, the "reset" functionality may not be included, and the programmable filter will simply utilize the last treble/bass adjustment factors when the next call is initiated.

What has been described is deemed to be illustrative of the principles of the present invention. It should be apparent that while certain frequencies were discussed in association with the various control tones, any other frequency outside of the nominal voice band may be used instead. Indeed, a larger set of control tones may be used if a "fine" adjustment is desired (e.g., "low" bass increase/decrease, "high" bass increase/decrease, "low" treble increase/decrease, and "high" treble increase/decrease). In general, any suitable set of tones can be used, as long as the frequency spacing between tones is sufficient to allow for correct detection at the codec. Further, tone detector 20 may comprise any arrangement suitable for detecting the predefined frequencies; a set of notch filters is considered to be exemplary only. Indeed, numerous other modifications may be made by those skilled in the art without departing from the spirit and scope of the present invention.

What is claimed is:

1. A codec for performing coding and decoding functions on transmitted and received audio telephony signals, CHARACTERIZED IN THAT the codec comprises a programmable bass/treble control means, said control means comprising tone detecting means disposed along a receive signal path within said codec, said tone detecting means for recognizing and removing predetermined out-of-voiceband bass/treble control tones from a received audio telephony signal; and equalization filtering means disposed along a transmit signal path within said codec, said equalization filtering means having as an input an audio telephony signal to be transmitted, said equalization filtering means responsive to the bass/treble control tones removed by said tone detecting means, said control tones used to modify the filter characteristics of said equalization filtering means.

2. A codec as defined in claim 1 wherein the predetermined bass/treble control tones comprise one or more of the following out-of-voiceband control tones: a treble increase control tone, a treble decrease control tone, a bass increase control tone, and a bass decrease control tone.

3. A codec as defined in claim 2 wherein the predetermined control tones comprise each of the treble increase control tone, treble decrease control tone, bass increase control tone and bass decrease control tone.

4. A codec as defined in claim 1 wherein the predetermined bass/treble control tones further comprise a "reset" control tone that causes the equalization filtering means to return to a predetermined filter characteristic.

5. A system for providing bass/treble control of an audio telephony signal, the system comprising a codec for performing coding and decoding functions on transmitted and received audio telephony signals and comprising bass/treble control means including tone detecting means disposed along a receive signal path within said codec, said tone detecting means for recognizing and removed predetermined out-of-voiceband bass/treble control tones from a received audio telephone signal; and equalization filtering means disposed along a transmit signal path within said codec, said equalization filter means having as an input an audio telephone signal to be transmitted, said equalization filter means also responsive to the control tones removed by said tone detecting means, said control tones used to modify the filter characteristics of said equalization filtering means; and a subscriber station set including means for generating out-of-voiceband bass/treble control tones.

6. A system as defined in claim 5 wherein the subscriber station set control tone generating means comprises means for generating a plurality of out-of-voiceband tones, a separate tone associated with each of the following bass/treble control signals: a treble increase signal, a treble decrease signal, a bass increase signal and a bass decrease signal.

7. A system as defined in claim 6 wherein the subscriber station set control tone generating means further comprises means for generating an out-of-voiceband "reset" signal, the reset signal used by the equalization filtering means to return the filter characteristics to a predetermined value.

8. A method of controlling the bass and treble quality of a received telephony signal, the method comprising the steps of:
   a) transmitting an out-of-voiceband control tone from a telephone station set to a remotely located codec;
   b) detecting a transmitted control tone within the remotely located codec;
   c) removing the detected transmitted control tone from the received signal and applying the removed control tone as an adjustment input to a programmable equalization filter disposed in the transmit signal path; and
   d) modifying the filter characteristics of said programmable equalization filter in response to the applied control tone.

9. The method as defined in claim 8 wherein in performing step a), the control tone is from a set of separate control tones defined as comprising a treble increase control tone, a treble decrease control tone, a bass increase control tone, and a bass decrease control tone.

10. The method as defined in claim 8 wherein in performing step b) the control tone is detected using a notch filtering technique.

11. The method as defined in claim 8 wherein the control tones further comprise a "reset" tone for returning the programmable equalization filter to a predetermined filter characteristic.

* * * * *